United States Patent Office 3,518,242
Patented June 30, 1970

3,518,242
POLYVINYL ALCOHOL AND DERIVATIVES CROSSLINKED WITH TITANIUM, PERMANGANATE, OR VANADYL IONS
Joseph D. Chrisp, Claymont, Del., assignor to E. I. du Pont de Nemours and Company, Wilmington, Del., a corporation of Delaware
No Drawing. Filed Mar. 30, 1966, Ser. No. 538,536
Int. Cl. C08f 3/34
U.S. Cl. 260—91.3                                12 Claims

ABSTRACT OF THE DISCLOSURE

A method is disclosed for crosslinking a polyvinyl polyhydroxy compound (polyvinyl alcohol) which comprises reacting, in an aqueous solution, the polyhydroxy compound with a crosslinking agent selected from a vanadyl ion, a titanium ion in the plus three valence state, or a permanganate ion and increasing the pH of the reaction mixture.

---

This invention relates to polyvinyl polyhydroxy compounds and more particularly to the insolubilizing or hardening of articles formed from polyvinyl alcohol and its water-soluble derivatives, to the production of articles of crosslinked polyvinyl alcohol and its water-soluble derivatives, and to the crosslinking of polyvinyl alcohol and its water-soluble derivatives to form dispersing agents and viscosity agents.

By this invention the chemical and physical properties of normally water-soluble polyvinyl polyhydroxy compounds are modified to render the compounds water-insoluble or less water soluble. Such polyvinyl polyhydroxy compounds when treated with the crosslinking agents disclosed hereinafter exhibit improved resistance to bending and tearing, to the solubilizing action of water and organic solvents, and to the diffusion therethrough of gases, vapors and liquids. Such compounds, when rendered only partially water-insoluble, can be employed as dispersing agents to hold insoluble material in suspension, and as viscosity control agents.

Examples of normally water-soluble polyvinyl polyhydroxy compounds which can be used in the practice of this invention are polyvinyl alcohols of various degrees of polymerizations and their derivatives such as their partial esters, their partial ethers, and partial acetals or mixtures thereof with or without additions of other materials, such as fillers colorants and plasticizers.

Of the above normally water-soluble polyvinyl polyhydroxy compounds, polyvinyl alcohol is preferred. The term "polyvinyl alcohol" referred to above, and used hereinafter throughout the specification and claims, means the water-soluble products obtained from the complete or partial alcoholysis or hydrolysis of polyvinyl esters such as polyvinyl acetate. Complete hydrolysis or alcoholysis is regarded to have occurred when 99–100% of the ester groups of the polyvinyl ester have been replaced by hydroxyl groups. Partial alcoholysis or hydrolysis is regarded to have occurred when 50–99% of the ester groups have been replaced by hydroxyl groups.

The crosslinking agents for forming reaction products of this invention with the above water-soluble polyvinyl polyhydroxy compounds are the water-soluble titanium compounds wherein the titanium is in the plus 3 valence state, the water-soluble vanadyl, $VO^{++}$, compounds, and the water-soluble permanganate compounds. Examples of such water-soluble compounds are $Ti_2(SO)_3$, $VOSO_4$ and $KMnO_4$. The above compounds must be capable of releasing substantial quantities of the $Ti^{+3}$, $VO^{++}$ and $MnO_4^-$ ions as such into solution as opposed to complexed forms thereof which are incapable of crosslinking polyvinyl polyhydroxy compounds under the operating conditions.

That aspect of the invention which relates to the formation of articles from aqueous solutions of normally water-soluble polyvinyl polyhydroxy compounds and the above crosslinking agents, as well as the formation of dispersing agents and viscosity control agents will be described in detail, and thereafter the treatment of preformed articles to render the same water insoluble will be discussed.

The articles referred to in the above paragraph as being formed from solutions include, but are not limited to, gelled bodies such as slabs or shaped moldings usable for packaging purposes. Such gelled bodies may be foams formed by sparging or otherwise mixing air or other gases into the solutions from which the articles are produced.

The term gel as used in this invention refers to a mixture, one of which components is water, and the other of which is a continuous mechanical network or structure which consists of a reaction product of at least one of the above defined polyvinyl polyhydroxy compounds and crosslinking agents of the invention. The gel may be of such strength as to totally or only partially immobilize the aqueous component thereof.

To form a gel in accordance with this invention from a solution, the kind and concentration of normally water-soluble polyvinyl polyhydroxy compound, and the pH value of the solution will determine the amount of crosslinking agent that should be employed. Generally, the higher the degree of polymerization of the compound, and the higher the percentage of hydroxyl groups, the lower the concentration of crosslinking agent that will be required to effect gellation. Aqueous solutions containing from 1.5 to 15% normally water-soluble polyvinyl polyhydroxy compounds have been successfully gelled.

The pH of the such solutions must be maintained within limits to effect gellation. If the pH is too low, gellation will not occur or will occur too slowly; that is, gellation will be observed only hours or days after introduction of the crosslink agent into the solution. In the practice of this invention, crosslinking will normally be observed within 10 minutes. If the pH is too high, syneresis will result. Within the operable pH limits, gellation will occur adjacent the higher limit of pH with lower concentrations of crosslinking agent and polymer than can be successfully employed adjacent the lower limit of pH. The preferred pH range is between about 4 and about 11 with gellation in some instances being observed with pH values as low as 1.5 and as high as 12.

Sodium hydroxide may be used to raise the pH of the solutions to any level desired. Where delayed gellation is desired as for example in the manufacture of foam, a solution of low concentrations of polyvinyl polyhydroxy compound and crosslinking agent may be formed at a pH at which crosslinking does not occur, and thereafter magnesium, calcium or barium hydroxides or oxides of magnesium, calcium or barium may be added to the solution which on dissolving increases the pH of the solution to a level at which crosslinking will occur. Hydrochloric acid and acetic acid are examples of compounds which can be used to lower the pH of solutions used in this invention.

Amounts of vanadyl compound wherein the vanadyl ion is within the range of 1 to 0.1% by weight based on the weight of fully hydrolyzed high molecular weight polyvinyl alcohol has been found effective gelling quantities. Higher amounts of compounds wherein the vanadyl ion is about 5% by weight of normally water soluble polyvinyl polyhydroxy polymers are usable with low molecular weight polymers, having hydroxyl groups as only a small percentage, about 50% of the active groups thereof. Smaller amounts as low as 0.05% by weight of this cation can be used to form dispersing agents or viscosity control agents in solution.

The amount of titanium ion in the plus three valence state introduced to effect crosslinking is substantially identical with that of the vanadyl ion, and the amount of permanganate ion required is about the same. Only slightly greater amounts of permanganate ion, equal to about 10% more than the amount of vanadyl ion disclosed above is required to produce a similarly degree of crosslinking. The amount of permanganate ion needed to effect crosslinking is less influenced by pH than is the crosslinking achieved through the use of vanadyl ions and the abovementioned titanium ions.

The formation of gelled articles, solutions of dispersing agents and solutions of viscosity control agents are preferably carried out in the following manner. The normally water-soluble polyvinyl polyhydroxy compound is mixed with water and permitted to stand until it is hydrated. Hydration is accompanied by a swelling of the polyvinyl polyhydroxy compound and an increase in the viscosity of the water to which its been added. The crosslinking agent is then added to the polyvinyl polyhydroxy compound solution. To avoid the formation of only localized crosslinking in the solution, the crosslinking agent is added in a dilute solution of from 0.03 to 3 molar concentration and preferably of from 0.05 to 1 molar concentration. Due to the tendency of the permanganate ion to effect localized crosslinked, it is recommended that the molar concentrations thereof be adjacent the lower limit of the preferred range. The solutions are then mixed to provide intimate contact of the reagents. When the crosslinking agents of $Ti^{+3}$ and $VO^{++}$ are employed, any base that is to be added should be incorporated into the polyvinyl polyhydroxy compound solution after the crosslinking agent has been added, and preferable during or just prior to the mixing operation. Introduction of base into the polyvinyl polyhydroxy compound solution prior to the introduction of these crosslinking agents tends to increase the formation of hydroxides of the cations of these crosslinking agents with the result that larger quantities of crosslinking agents than would otherwise be needed are required. The sequence of introducing the permanganate ion and base has little effect on the amount of permanganate ion required.

Herebelow are set forth a number of examples wherein polyvinyl alcohol, the preferred polyvinyl polyhydroxy compound, in solution is crosslinked using solutions of the crosslinking agents of this invention. It will be appreciated that the mixed solutions can be poured into molds or onto trays to provide any shaped gelled article desired. By reducing the amount of either the polyvinyl alcohol or crosslinking agent or both, the amount of crosslinked polyvinyl alcohol formed can be insufficient to completely immobilize the water with which it is mixed, but sufficient to increase both the viscosity and dispersing power of the solution.

EXAMPLE 1

Into 50 grams of a 10% polyviyl alcohol ("Elvanol" 71–24, a high molecular weight fully hydrolyzed grade having a 4% aqueous solution viscosity of 20 to 30 centipoises) solution was added ½ ml. of 0.3 M $VOSO_4$. Gelation was observed at once without the addition of a base. The gel, which was sticky, had a pH of 4.0.

EXAMPLE 2

Into 50 grams of a 10% polyvinyl alcohol ("Elvanol" 71–24) solution was added ½ ml. of 0.3 M $VOSO_4$. On the addition of ¼ of a ml. of 20% NaOH, increased crosslinking was observed and the color of the gel changed from light blue to light brown. The gel was non-tacky and firm.

EXAMPLE 3

Into 50 grams of a 5% solution of polyvinyl alcohol ("Elvanol" 71–24) was added 1/10 of a ml. of 5% HCl. The pH of the solution was 4.5. With the addition of ½ of a ml. of 0.3 M $VOSO_4$ and 3/20 of a ml. of a 20% solution of NaOH, crosslinking was observed. The resulting gel was a good non-tacky system, light brown in color.

EXAMPLE 4

Into 50 grams of a 5% solution of polyvinyl alcohol ("Elvanol" 71–24) was added 1/10 of a ml. of $CH_3COOH$ which lowered the pH of the solution to 4.5. On the addition of ¼ of a ml. of 0.3 M $VOSO_4$ a clear, sticky crosslinking mass was observed.

EXAMPLE 5

Into 25 grams of a 5% solution of polyvinyl alcohol ("Elvanol" 71–24) was added ½ ml. of 0.3 M $VOSO_4$. Some crosslinking was observed. With the addition of ½ ml. of 20% NaOH, a stiff, non-tacky, light brown gel was observed.

EXAMPLE 6

Into 50 grams of a 10% aqueous solution of polyvinyl alcohol ("Elvanol" 71–24) was added 3 ml. of a 0.30 M solution of $VOSO_4$. Gelation of the solution was observed when the solution was made slightly basic with a 20% solution of NaOH. The resulting gel was non-tacky, light pink, elastic and crosslinked to a firm mass.

EXAMPLE 7

Into 25 grams of 10% aqueous solution of polyvinyl alcohol ("Elvanol" 71–24) was added 3 ml. of 0.3 M $VOSO_4$. Rapid gellation and syneresis occured when a large excess, 3 ml., of 20% NaOH was added.

EXAMPLE 8

Into 25 grams of a 5% aqueous solution of polyvinyl alcohol ("Elvanol" 71–24) was added a ½ ml. of a 0.52 M solution of $Ti_2(SO_4)_3$. On addition of 1 ml. of a 20% solution of NaOH, crosslinking at once to a non-tacky gel was observed.

EXAMPLE 9

Into 25 grams of a 2% aqueous solution of polyvinyl alcohol ("Elvanol" 71–24) was added a ½ ml. of a 0.52 M solution of $Ti_2(SO_4)_3$. Gelation of the solution was observed on the addition of 1 ml. of a 20% solution of NaOH which increased the pH to 11. The resulting gel was sticky and there was some crosslinking.

EXAMPLE 10

Into 25 grams of a 10% aqueous solution of polyvinyl alcohol ("Elvanol" 71–24) was added ¼ of a ml. of a 0.52 M solution of $Ti_2(SO_4)_3$. Gelation of the solution which had a pH of 1.5, was observed without the addition of base. The resulting gel was clear and non-tacky.

EXAMPLE 11

Into 25 grams of a 5% aqueous solution of polyvinyl alcohol ("Elvanol" 71–24) was added ¼ of a ml. of a 0.52 M solution of $Ti_2(SO_4)_3$. Gelation of the solution was observed on the addition of a 3/20 of a ml. of a 20% solution of NaOH. The resulting gel was non-tacky and was crosslinked.

EXAMPLE 12

Into 25 grams of a 5% aqueous solution of polyvinyl alcohol ("Elvanol" 71–24) was added ½ of a ml. of a 0.52 M solution of $Ti_2(SO_4)_3$. Gelation of the solution which had a pH of 1.5, was observed without the addition of base, but crosslinking was very slow requiring about 30 minutes.

EXAMPLE 13

Into 25 grams of a 10% aqueous solution of polyvinyl alcohol ("Elvanol" 71-24) was added ¼ of a ml. of a 0.31 M solution of $KMnO_4$. Gelation of the solution was observed without the addition of base. The solution crosslinked at once to a purple, non-tacky gel.

EXAMPLE 14

Into 25 grams of a 10% aqueous solution of polyvinyl alcohol ("Elvanol" 71-24) was added ½ ml. of a 0.31 M solution of $KMnO_4$. The gel which formed was observed to become more highly crosslinked with the addition of ½ ml. of a 20% solution of NaOH.

EXAMPLE 15

Into 25 grams of a 5% aqueous solution of polyvinyl alcohol ("Elvanol" 71-24) was added 1 ml. of a 0.31 M solution of $KMnO_4$. Crosslinking resulted without the addition of a base.

EXAMPLE 16

Into 25 grams of a 5% aqueous solution of polyvinyl alcohol, a high molecular weight fully hydrolyzed grade having a 4% aqueous solution of viscosity of 45 to 55 centipoises ("Elvanol 72-51) was added ¼ of a ml. of a 0.31 M solution of $KMnO_4$. Crosslinking accurred after 15 minutes without the addition of a base.

EXAMPLE 17

Into 25 grams of a 5% aqueous solution of polyvinyl alcohol ("Elvanol" 72-51) was added ½ of a ml. of a 0.31 M solution of $KMnO_4$. Gelation of the solution was observed without the addition of a base. The resulting gel was non-tacky, stiff and crosslinked.

EXAMPLE 18

Into 25 grams of a 10% aqueous solution of polyvinyl alcohol ("Elvanol" 71-30, a high molecular weight fully hydrolyzed grade having a 4% aqueous solution viscosity of 25 to 35 centipoises) was added ½ ml. of 0.15 M solution of $KMnO_4$. Crosslinking occurred at once without the addition of base to produce a very stiff non-tacky gel.

EXAMPLE 19

Into 25 grams of a 10% aqueous solution of polyvinyl alcohol ("Elvanol" 71-30) was added enough dilute, 4 N., $HNO_3$ to lower the pH of the solution to 4.5. With the addition of ½ ml. of 0.15 M $KMnO_4$, a medium stiff gel formed at once without the addition of base.

In addition to being used as indicated above, the crosslinking agents of this invention may be applied to preformed articles of water-soluble polyvinyl polyhydroxy compounds such as films, sheets, yarns and conduits. The crosslinking agent may be applied in any desired manner as by dipping the article into a solution thereof, by feeding it therethrough or by spraying the same onto the article. Preferably the article is pretreated with water to swell the surfaces or surfaces thereof to be treated prior to contacting the surface or surfaces with crosslinking agent. This pretreatment enables the crosslinking agent to penetrate the surface and form an insolubilized layer of greater thickness in the surface portion of the article than would be possible in the absence of such treatment. In those instances where a pretreatment with water is employed, the crosslinking agent may be applied to the wetted surface of the article in finely divided form. Preferably, however, it is applied as an aqueous solution as in the instances when an aqueous pretreatment is not employed. The concentration of crosslinking agent in solution is generally from 0.03 to 3 molar with a molarity of from 0.05 to 1 being preferred.

The crosslinking solution is applied within ten minutes, and conveniently about one minute after initiation of the aqueous pretreatment and permitted to remain in contact with the surface of the article for from one-half to ten minutes, and preferably about one minute before it is removed by washing. Base may be included in the pretreating water or may be applied at any time thereafter prior to or at the time of washing. Preferably, it is applied immediately after application of the crosslinking agent.

Having described the various embodiments of the invention for purposes of illustration rather than limitation, what is claimed is as follows:

1. A method for preparing a non-tacky, gelled article comprising hydrating a quantity of polyvinyl alcohol, initiating a cross-linking reaction by contacting the hydrated polyvinyl alcohol with an aqueous solution of a cross-linking agent selected from the group consisting of vanadyl ions, titanium ions in the plus three valence state, and permanganate ions, and increasing the pH of the reaction mixture until at least a non-tacky gel and an improved degree of cross-linking is obtained.

2. A method according to claim 1 wherein said crosslinking agent comprises vanadyl ions.

3. A method according to claim 1 wherein said crosslinking agent comprises titanium ions in the plus three valence state.

4. A method according to claim 1 wherein said crosslinking agent comprises permanganate ions.

5. In a method for improving the water insolubility of the polyvinyl alcohol surface of an article by contacting said surface with an aqueous solution of a cross-linking agent, the improvement wherein said agent is selected from the group consisting of vanadyl ions, titanium ions in the plus three valence state, and permanganate ions and cross-linking is promoted by increasing the pH at said surface until a non-tacky condition is obtained.

6. A method according to claim 5 wherein said surface is treated with water to effect surface hydration prior to contacting said cross-linking agent.

7. A method according to claim 5 wherein the pretreatment water includes a base for promoting crosslinking.

8. A method according to claim 5 wherein the concentration of cross-linking agent in said aqueous solution is from 0.03 M to 3 M and said solution contacts said surface from ½ to 10 minutes.

9. A method according to claim 5 wherein the pH at the article surface is increased by contacting a base immediately after contacting said cross-linking agent.

10. A method according to claim 5 wherein said crosslinking agent comprises vanadyl ions.

11. A method according to claim 5 wherein said crosslinking agent comprises titanium ions in the plus three valence state.

12. A method according to claim 5 wherein said crosslinking agent comprises permanganate ions.

References Cited

UNITED STATES PATENTS

| | | | |
|---|---|---|---|
| 2,897,127 | 7/1959 | Miller | 204—154 |
| 2,362,026 | 11/1944 | Quist | 260—90 |
| 3,258,442 | 6/1966 | Sinclair | 260—29.6 |
| 3,264,245 | 8/1966 | Sinclair | 260—29.6 |

OTHER REFERENCES

Ind. Plastiques, 1946, 2, 20-1.

JOSEPH L. SCHOFER, Primary Examiner

S. M. LEVIN, Assistant Examiner

U.S. Cl. X.R.

260—73, 891, 874